US005739452A

United States Patent [19]
Nagata

[11] Patent Number: 5,739,452
[45] Date of Patent: Apr. 14, 1998

[54] KARAOKE APPARATUS IMPARTING DIFFERENT EFFECTS TO VOCAL AND CHORUS SOUNDS

[75] Inventor: Yuichi Nagata, Hamamatsu, Japan

[73] Assignee: Yamaha Corporation, Hamamatsu, Japan

[21] Appl. No.: 708,609

[22] Filed: Sep. 5, 1996

[30] Foreign Application Priority Data

Sep. 13, 1995 [JP] Japan .................................... 7-235793

[51] Int. Cl.$^6$ ............................ G09B 5/00; G10H 1/053; G10H 1/36

[52] U.S. Cl. ................................ 84/610; 84/630; 84/631; 84/DIG. 4; 84/DIG. 26; 434/307 A; 381/63

[58] Field of Search ..................... 84/609–614, 626–638, 84/DIG. 4, DIG. 26; 434/307 A, 308; 381/61–65

[56] References Cited

U.S. PATENT DOCUMENTS

| | | | |
|---|---|---|---|
| 5,235,124 | 8/1993 | Okamura et al. | 84/631 X |
| 5,243,123 | 9/1993 | Chaya | 84/609 |
| 5,294,746 | 3/1994 | Tsumura et al. | 84/631 |
| 5,518,408 | 5/1996 | Kawashima et al. | 84/609 X |
| 5,521,326 | 5/1996 | Sone | 84/631 |
| 5,542,000 | 7/1996 | Semba | 434/307 A X |

*Primary Examiner*—Stanley J. Witkowski
*Attorney, Agent, or Firm*—Pillsbury Madison & Sutro LLP

[57] ABSTRACT

A karaoke apparatus is provided with a pickup device that collects a singing voice sound to convert the same into a corresponding vocal signal. Further, a music generator device generates a music signal representative of a karaoke accompaniment sound which is selected to accompany the singing voice sound. A harmony generator device generates a harmony signal representative of a harmony chorus sound which is made consonant with the singing voice sound. A first processor device processes the vocal signal to impart an effect to the collected singing voice sound. A second processor device processes the harmony signal separately from the vocal signal to impart another effect to the harmony chorus sound independently from the singing voice sound. A sound device amplifies the processed vocal signal, the processed harmony signal and the generated music signal so as to sound the singing voice sound, the harmony chorus sound and the karaoke accompaniment sound concurrently with each other.

8 Claims, 7 Drawing Sheets

KARAOKE APPARATUS IMPARTING DIFFERENT EFFECTS TO VOCAL AND CHORUS SOUNDS

BACKGROUND OF THE INVENTION

The present invention relates to a karaoke apparatus provided with a harmonizing facility to generate a harmony signal musically harmonizing with a karaoke singing voice.

There is a known karaoke apparatus which reproduces karaoke sound with adding sound effects such as echo and reverberation to a vocal signal picked up by a microphone in order to enrich the karaoke performance.

Further, a recent karaoke apparatus is provided with harmonizing facility to generate a harmony chorus signal harmonizing with the karaoke singing voice. The applicant has already proposed such a karaoke apparatus in Japanese Patent Application No. Hei 7-16181. In this patent application, the harmonizing facility is achieved by shifting a pitch of the vocal signal to generate the harmony signal harmonizing with the singing voice. The generated harmony signal is mixed with the singing voice.

In the prior art noted above, the sound effects such as echo and reverberation are added to an audio signal generated by mixing the input vocal signal and the harmony signal. Accordingly, the same sound effect is always added to the original vocal signal and the synthesized harmony signal.

However, the type or depth of the sound effect suitable for the original vocal signal is different from that for the harmony signal. For example, a certain type or depth of the sound effect is appropriate for the original vocal signal, but the same effect may be excessive or insufficient for the harmony signal. On the other hand, even if a certain type or depth of the effect may be good for the harmony signal, the same effect may be excessive or insufficient for the vocal signal. A compromised type or depth of the sound effect may be selected for both of the vocal and harmony signals, but the compromised one may not be optimum for both of the signals. Further, the signal processing for generating or synthesizing the harmony signal takes several mill-seconds to several tens mili-seconds, and thus the harmony signal follows the vocal signal with a delay. Addition of the same effect of the vocal signal to such a delayed harmony signal without considering the delay may result in an unnatural harmonizing effect. Thus, the singer may be disturbed by the effect.

SUMMARY OF THE INVENTION

The purpose of the present invention is to solve the problems noted above, and to provide optimum sound effects independently for the vocal and harmony signals so that the karaoke singer can comfortably sing in karaoke performance.

According to the invention, a karaoke apparatus comprises a pickup device that collects a singing voice sound to convert the same into a corresponding vocal signal, a music generator device that generates a music signal representative of a karaoke accompaniment sound which is selected to accompany the singing voice sound, a harmony generator device that generates a harmony signal representative of a harmony chorus sound which is made consonant with the singing voice sound, a first processor device that processes the vocal signal to impart an effect to the collected singing voice sounds a second processor device that processes the harmony signal separately from the vocal signal to impart another effect to the harmony chorus sound independently from the singing voice sound, and a sound device that amplifies the processed vocal signals the processed harmony signal and the generated music signal so as to sound the singing voice sound, the harmony chorus sound and the karaoke accompaniment sound concurrently with each other.

DETAILED DESCRIPTION OF THE INVENTION

Figure 1:
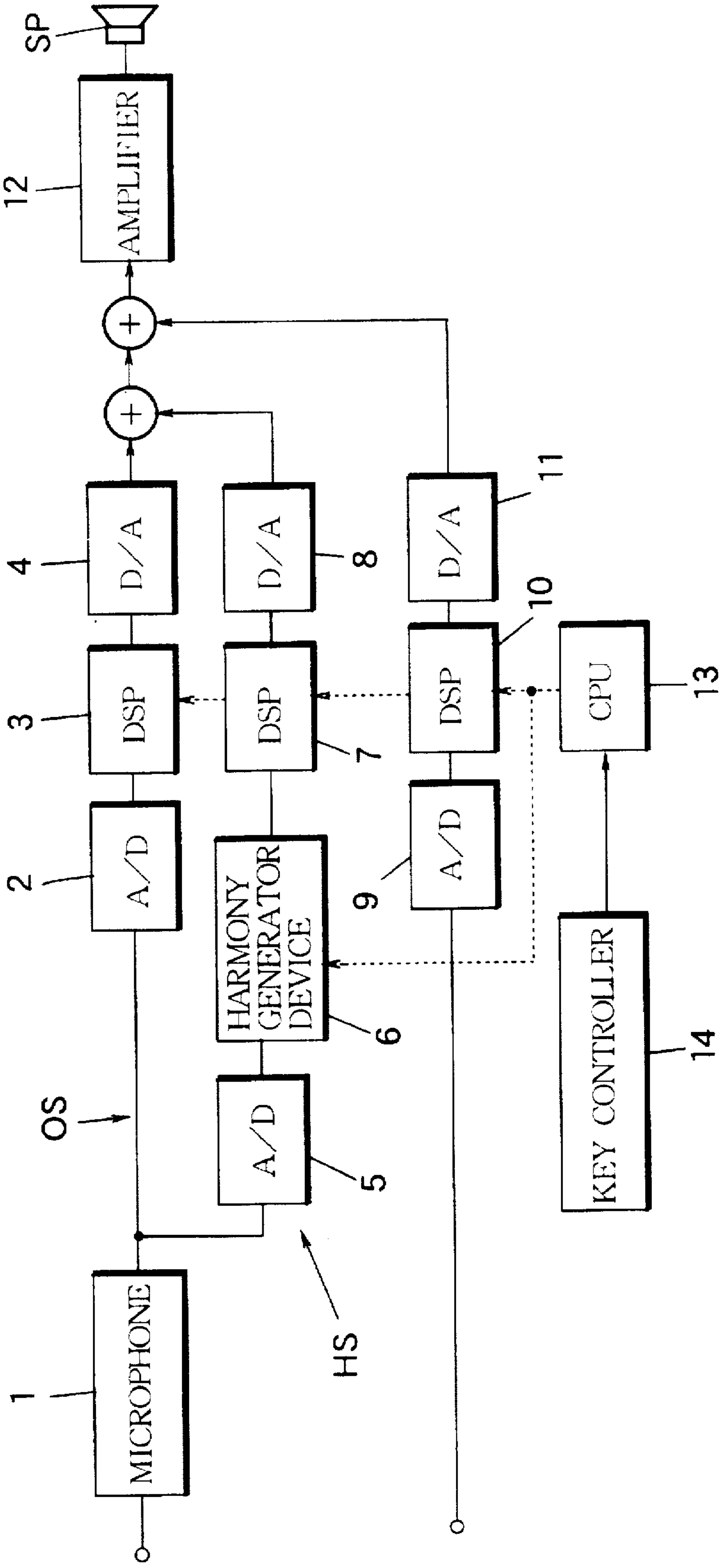
FIG. 1 is a schematic block diagram illustrating an embodiment of a karaoke apparatus according to the present invention.

Details of an embodiment of the present invention will be described with reference to the drawings hereunder. FIG. 1 is a schematic block diagram illustrating a karaoke apparatus according to the present invention. However, the present invention is not limited only to the embodiment described below. In FIG. 1, a pickup device such as a microphone 1 picks up or collects a singing voice sound of a karaoke singer, then converts the same into an electric vocal signal, and outputs the vocal signal. The vocal signal is divided into an original sound processing system OS and a harmony signal generating system HS. In the original sound processing system OS, an A/D (Analog/Digital) converter 2 converts the original vocal signal into a corresponding digital signal. A first processor device in the form of a DSP (Digital Signal Processor) 3 adds or imparts various sound effects such as echo, reverberation and frequency response to the vocal signal digitized by the A/D converter 2. The effect-imparted vocal signal is converted into an analog signal by a D/A (Digital/Analog) converter 4.

In the harmony signal generating system HS, an A/D converter 5 converts the input vocal signal into a corresponding digital signal. The pitch of the digitized vocal signal fed from the A/D converter 5 is shifted by a harmony generator device 6 in order to generate a harmony signal musically harmonizing with the original vocal signal. A DSP 7 is a second processor device structured similarly to the DSP 3 so as to add various sound effects to the harmony signal generated by the harmony generator device 6. The harmony signal processed and effect-added by the DSP 7 is converted into an analog signal by a D/A converter 8. The output of the D/A converter 8 is mixed with the original vocal signal fed from the D/A converter 4.

An A/D converter 9 converts a music signal representative of a karaoke accompaniment sound including a melody part and a rhythm part, which are provided based on a song data stored in an external memory media such as LD (Laser Disc) and CD (Compact Disc), into a corresponding digital signal. A third processor device in the form of a DSP 10 adds various sound effects such as echo, reverberation and frequency response to the music signal digitized by the A/D converter 9. However, the structure of the third DSP 10 is slightly different from that of the first DSP 3 and the second DSP 7 as described later. The music signal processed and effect-added by the DSP 10 is converted into an analog signal by a D/A (Digital/Analog) converter 11. The output of the D/A converter 11 is mixed with the signals fed from the D/A converters 4 and 8.

An amplifier 12 amplifies the mixed signals of the outputs from the respective D/A converters 4, 8, and 11. A loud-speaker SP acoustically reproduces the mixed sound signals amplified by the amplifier 12. Namely, the amplifier 12 and the loud-speaker SP constitute a sound device.

A CPU 13 controls operation of the whole system. The CPU 13 controls the harmony generator device 6 and the DSPs 3, 7, and 10 in response to key input information from a key controller 14. The key input information includes a command of song selection, a designation of an effect mode such as echo, and a command for the harmony generation. Further, the CPU 13 constitutes a part of a music generator device for generating the music signal.

Figure 2:
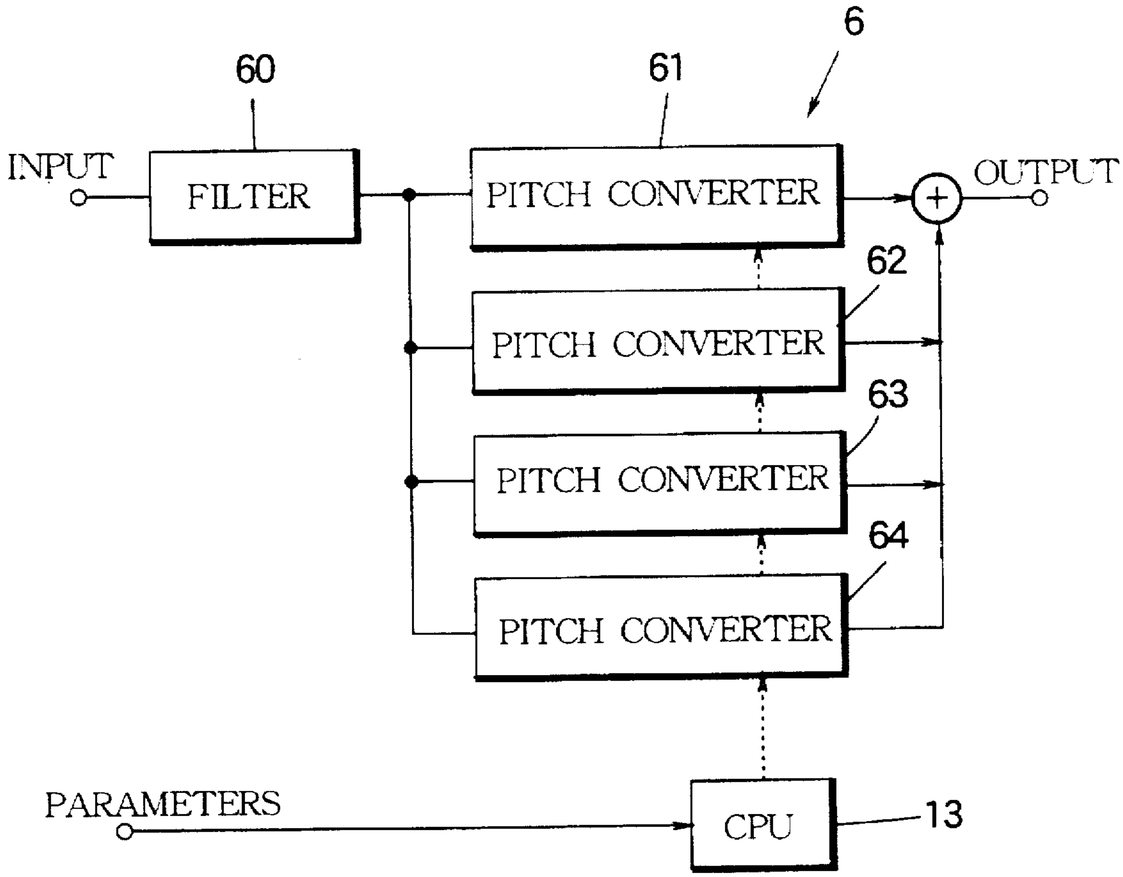
FIG. 2 is a schematic block diagram illustrating an arrangement of a harmony generator device in the embodiment of the inventive karaoke apparatus.

The detailed structure of the harmony generator device 6 will be described hereunder with reference to FIG. 2. As shown in FIG. 2, the harmony generator device 6 is comprised of a filter 60 and pitch converters 61 to 64. The filter 60 eliminates undesirable noise components from an input of the original vocal signal. The pitch converters 61 to 64 shift the pitch (frequency) of the original vocal signal passed through the filter 60 by predetermined degrees in order to generate a harmony signal representative of a harmony chorus sound harmonizing well with the original singing voice sound. In the present embodiment, it is possible to present parallel parts of the chorus sound having various chords by generating the harmony chorus sound through channels of the four pitch converters 61 to 64. The parameters to control the pitch shift can be stored in a ROM. The CPU 13 reads out the parameters from the ROM in order to distribute them to the pitch converters 61 to 64.

The structure of the DSPs 3, 7, and 10 will be described hereunder with referring to FIGS. 3 to 7. The structure of the first DSP 3 which processes the original vocal signal is the same as that of the second DSP 7 which handles the signal processing on the harmony signal. However, the structure of the third DSP 10, which handles the music signal, is different from that of the DSPs 3 and 7 with respect to an echo controller. The difference will be described later. Therefore, the general structure of the DSP is explained referring to the first DSP 3 as an example, and the structure of the DSP 10 will be described later with respect to the echo controller.

Figure 3:
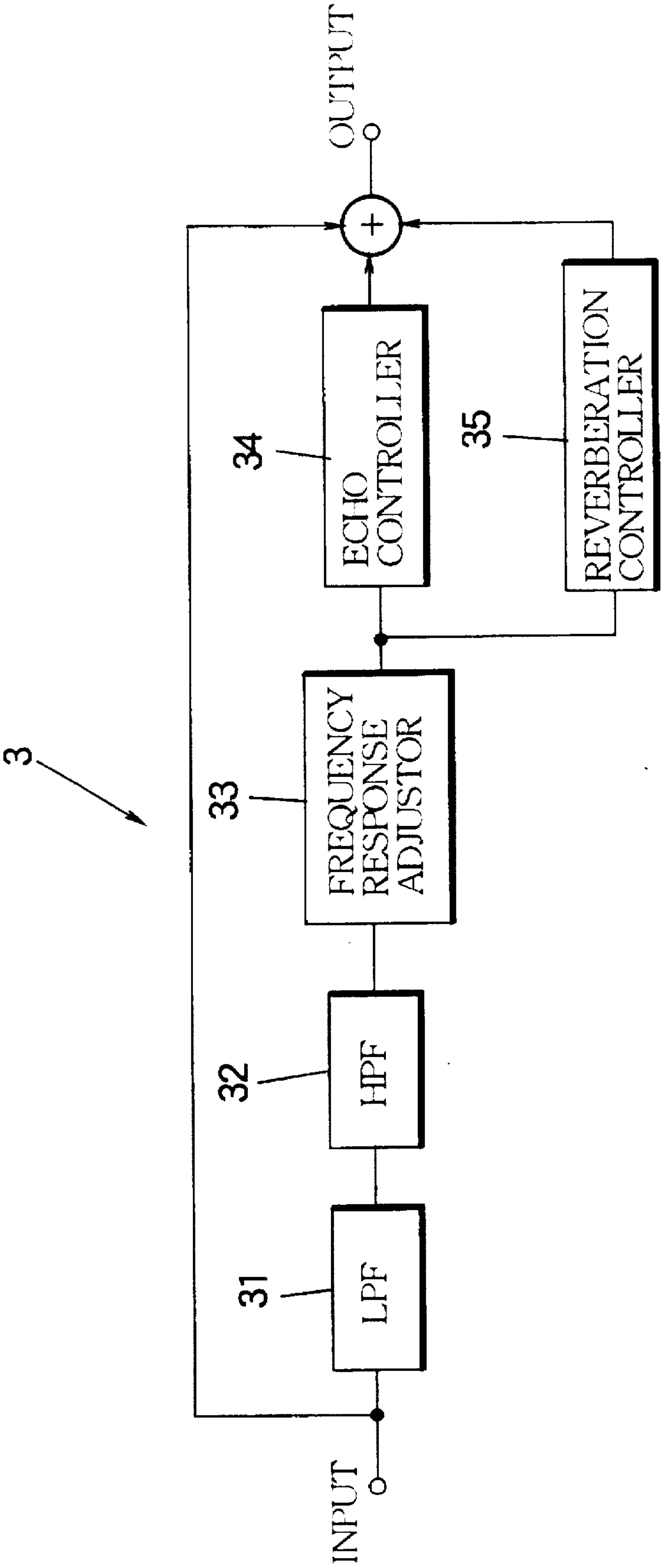
FIG. 3 is a schematic block diagram illustrating an arrangement of a DSP in the embodiment of the inventive karaoke apparatus.

FIG. 3 is a schematic block diagram illustrating an embodiment of the DSP 3. In FIG. 3, the DSP 3 is comprised of an LPF (Low Pass Filter) 31, an HPF (High Pass Filter) 32, a frequency response adjustor 33, an echo controller 34, and a reverberation controller 35. The LPF 31 and HPF 32 eliminate noises such as harmonics and low frequency components, and pass only a necessary frequency range of the input signal.

Figure 4:
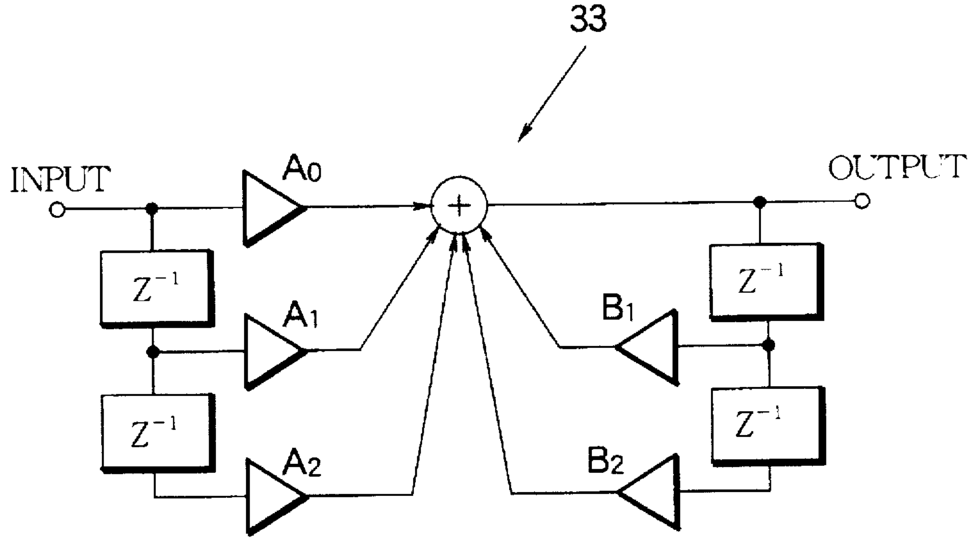
FIG. 4 is a schematic block diagram illustrating an arrangement of a frequency response adjustor provided in the DSP.

The frequency response adjuster 33 is structured in the form of a digital filter as shown in FIG. 4. In FIG. 4, filter coefficients A0, A1, A2, B1, B2 are controlled by the CPU 13 according to the parameters read out from a ROM in response to key input information provided by the key controller 14. The input vocal signal is adjusted to have a certain frequency characteristic specified by the parameters.

Figure 5:
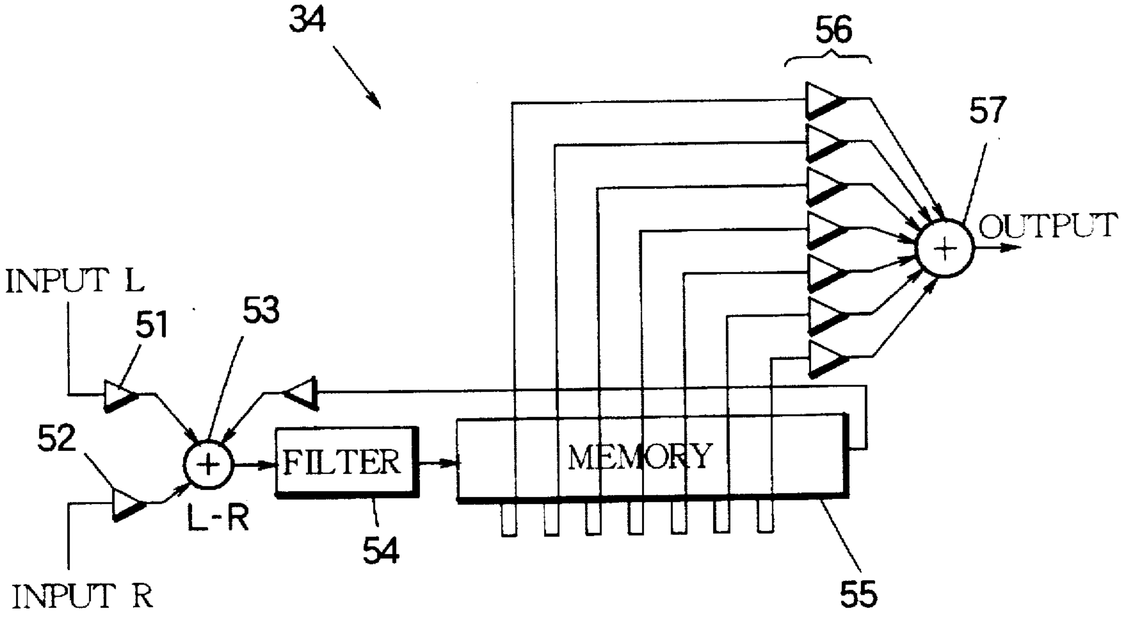
FIG. 5 is a schematic block diagram illustrating an arrangement of an echo controller provided in the DSP.

The echo controller 34 is also structured in the form of a digital filter as shown in FIG. 5. In FIG. 5, input signals L and R are attenuated by attenuators 51 and 52, and then a differential signal L-R is generated by an adder 53. The differential signal L-R is fed to a delay memory 55 through a filter 54, which is used for adjustment of "surround" component. The memory 55 creates a delay time for the input vocal signal. The delay time corresponds to an interval between write/read timings of the memory 55. The differently delayed signals derived from the memory 55 are attenuated by attenuators 56, and are mixed by an adder 57. By these signal processings, a desired echo pattern can be produced for the vocal signal. The delay time can be controlled according to the write/read timing of the memory 55, while the echo level is controlled by coefficients of the attenuators 56.

Figure 6:
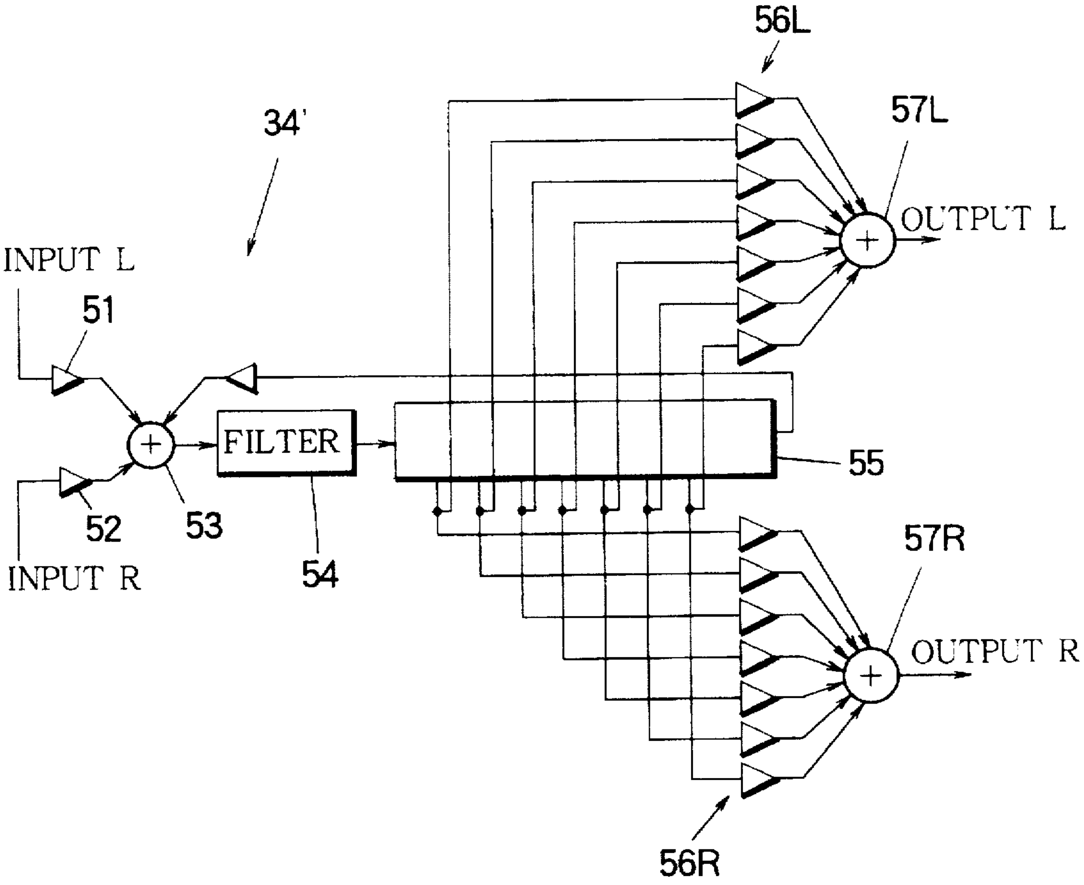
FIG. 6 is a schematic block diagram illustrating another arrangement of the echo controller provided in the DSP.

An echo controller 34' of the third DSP 10 is structured as shown in FIG. 6. In case of the echo controller 34', delayed signals from the memory 55 are divided into two channels L and R. The divided signals L and R are independently attenuated from each other by attenuators 56L and 56R for each channel, and are then mixed by adders 57L and 57R. The rest of the structure is the same as that of the echo controller 34 described before.

Figure 7:
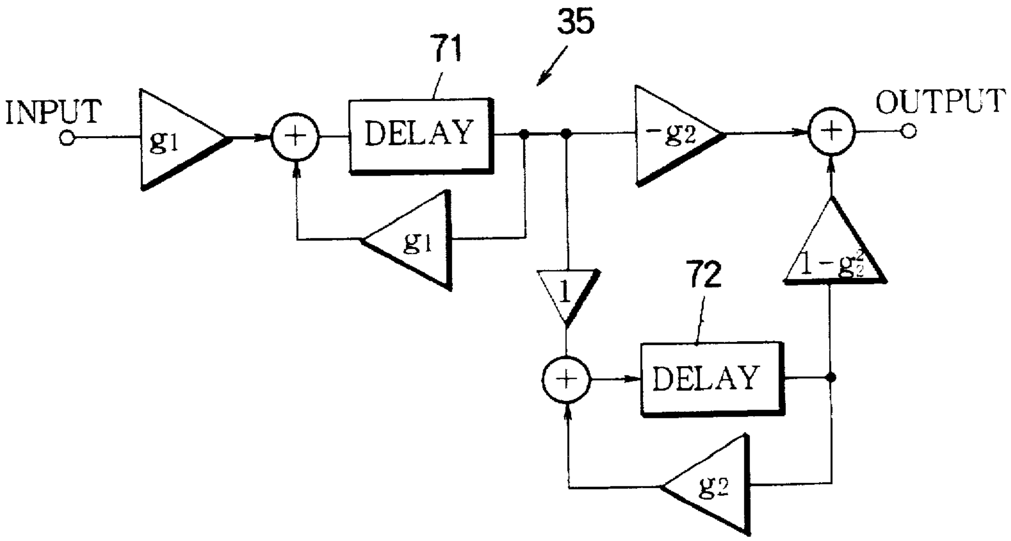
FIG. 7 is a schematic block diagram illustrating an arrangement of a reverberation controller provided in the DSP.

The reverberation controller 35 is structured in the form of a digital filter as shown in FIG. 7. In FIG. 7, a reverberation pattern can be controlled by modifying delay times and gain coefficients g1 and g2 in delays 71 and 72.

Figure 8A:
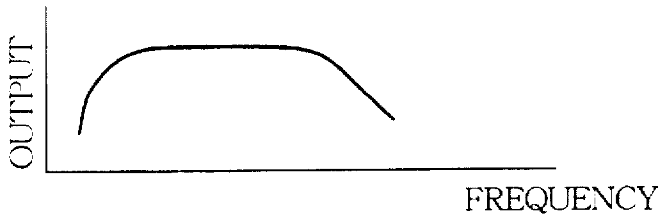
FIGS. 8(*a*), 8(*b*) and 8(*c*) are a graphic chart illustrating various sound effects applied to a main vocal signal picked up via a microphone.
Figure 8B:
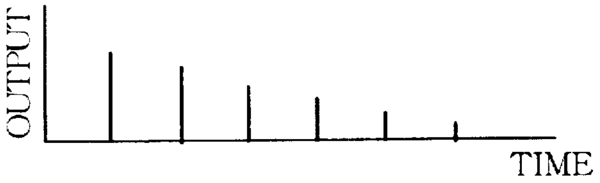
Figure 8C:
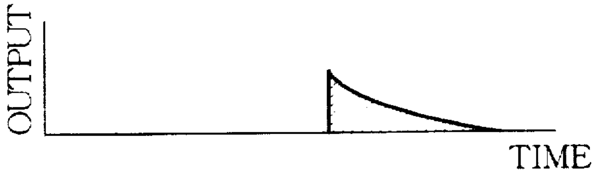

The DSPs 3, 7, 10 are independently controlled by the CPU 13 according to different parameters in order to control the sound effect signal processings for respective ones of the vocal signal, harmony signal and music signal separately from each other. Now, the operation of the embodiment of the inventive karaoke apparatus will be described hereunder. The original vocal signal is divided into the original sound processing system OS and the harmony signal generating system HS. In the original sound processing system OS, the vocal signal is converted into a digital signal by the A/D converter 2, and then the first DSP 3 adds sound effects appropriate for the main singing voice sound to the digital vocal signal. For example, the main vocal signal is adjusted to have a desired frequency characteristic as shown in FIG. 8(*a*), and is added with a suitable echo pattern and a reverberation pattern as shown in FIGS. 8(*b*) and 8(*c*), respectively. The effect-added vocal signal is converted into an analog signal by the D/A converter 4.

Figure 9A:
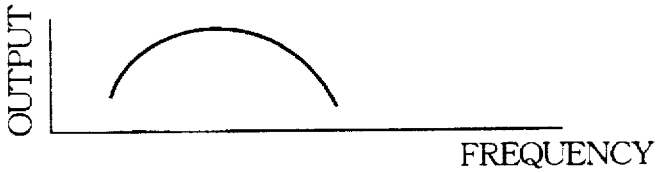
FIGS. 9(*a*), 9(*b*) and 9(*c*) are a graphic chart illustrating various sound effects applied to harmony signals harmonizing with the main vocal signal.
Figure 9B:
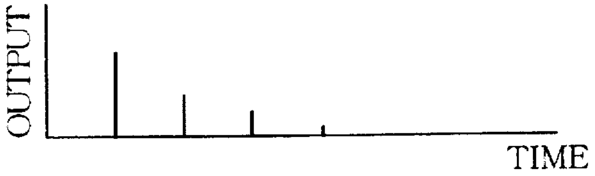
Figure 9C:

On the other hand, the original vocal signal branched into the harmony signal generating system HS is converted into a digital signal, and then the pitch of the vocal signal is shifted by the harmony generator device 6 to generate a harmony signal harmonizing with the original vocal signal. The harmony signal is added with sound effects appropriate for the harmony chorus sound by the second DSP 7. For example, the harmony signal is adjusted to have a desired frequency characteristic as shown in FIG. 9(*a*), and is added with a suitable echo pattern as shown in FIG. 9(*b*). The echo pattern of FIG. 9(*b*) may be set weaker or more moderate than the echo pattern of FIG. 8(*b*). However, the reverberation pattern is not applied to the harmony signal as shown in FIG. 9(*c*) so as to discriminate the harmony chorus sound from the singing voice signal. The effect-added harmony signal is converted into an analog signal by the D/A converter 8, and is then mixed with the vocal signal outputted from the D/A converter 4.

Figure 10:
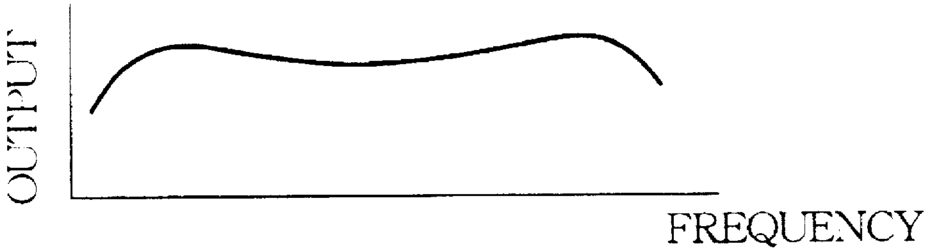
FIGS. 10(*a*)–10(*d*) are a graphic chart illustrating various sound effects applied to a karaoke music signal.
Figure 10:
Figure 10:
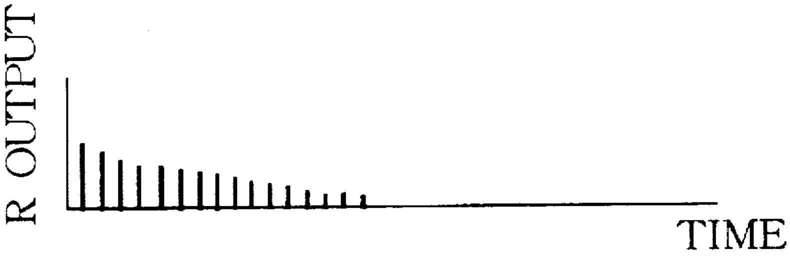
Figure 10:
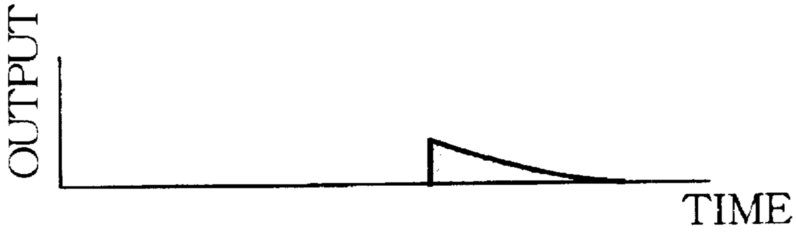

The music signal reproduced or generated from the karaoke song data read out from the external memory media is converted into a digital signal by the A/D converter 9, and then the third DSP 10 applies sound effects suitable for the karaoke accompaniment sound. For example, the frequency characteristic of the music signal is adjusted as shown in FIG. 10(*a*) so that the singer can easily keep track of the rhythm of the karaoke accompaniment. For the echo patterns of the music signal of the channels L and R, a relatively short delay time and a great repeat rate are selected as shown in FIGS. 10(*b*) and 10(*c*). The delay time of the reverberation pattern is adjusted rather short as shown in FIG. 10(*d*). The effect-added music signal is mixed with the vocal signal and the harmony signal, and then the mixed audio signal is amplified by the amplifier 12 to drive the speaker SP.

As described above, in the inventive karaoke apparatus, the pickup device such as the microphone 1 collects a singing voice sound to convert the same into a corresponding vocal signal. The music generator device including the CPU 13 generates a music signal representative of a karaoke accompaniment sound which is selected to accompany the singing voice sound. The harmony generator device 6 generates a harmony signal representative of a harmony chorus sound which is made consonant with the singing voice sound. The first processor device in the form of the DSP 3 processes the vocal signal to impart an acoustic effect to the collected singing voice sound. The second processor device in the form of the DSP 7 processes the harmony signal separately from the vocal signal to impart another acoustic effect to the harmony chorus sound independently from the singing voice sound. The sound device including the amplifier 12 and the loudspeaker SP amplifies the processed vocal signal, the processed harmony signal and the generated music signal so as to sound the singing voice sound, the harmony chorus sound and the karaoke accompaniment sound concurrently with each other. The first DSP 3 imparts a relatively strong effect to the singing voice sound while the second DSP 7 imparts a relatively weak or moderate effect to the harmony chorus sound. The first DSP 3 and the second DSP 7 impart an effect selected from a group consisting of echo, reverberation and frequency response at different degrees between the singing voice sound and the harmony chorus sound. The karaoke apparatus further includes the third processor device in the form of the DSP 10 that processes the music signal separately from the vocal signal and the harmony signal to impart a further effect to the karaoke accompaniment sound independently from the singing voice sound and the harmony chorus sound. The harmony generator device 6 shifts a pitch of the vocal signal to modify the same into the harmony signal. As described above, the original vocal signal, the synthesized harmony signal and the generated music signal are processed respectively by the DSPs 3, 7, and 10, which are independently controlled by the CPU 13, so that the optimum sound effect for each signal can be obtained.

The harmony generator device 6 is comprised of four pitch converters 61 to 64 in the disclosed embodiment described above. However, the number of the pitch converter is not limited to that. Any number of supplemental pitch converters can be added to the harmony generator device 6. The present invention can be applied to a network karaoke system. In the network karaoke system, the music signal is generated by a music generator device in response to MIDI (Musical Instrument Digital Interface) data distributed by a host computer through the network. The parameters to control the pitch converters 61 to 64 can be included in the MIDI data transmitted from the host computer.

As described above, according to the present invention, the vocal signal and the harmony signal can be added with different kinds and depths of sound effects independently from each other. Thus, the optimum sound effect for each signal can be selected so that the karaoke singer can comfortably sing in the karaoke performance.

What is claimed is:

1. A karaoke apparatus comprising:

a pickup device that collects a singing voice sound to convert the singing voice sound into a corresponding vocal signal;

a music generator device that generates a music signal representative of a karaoke accompaniment sound which is selected to accompany the singing voice sound;

a harmony generator device that generates a harmony signal representative of a harmony chorus sound which is made consonant with the singing voice sound, wherein the harmony generator device shifts a pitch of the vocal signal to modify the vocal signal into the harmony signal;

a first processor device that processes the vocal signal to impart an effect to the collected singing voice sound;

a second processor device that processes the harmony signal separately from the vocal signal to impart another effect to the harmony chorus sound independently from the singing voice sound; and a sound device that amplifies the processed vocal signal, the processed harmony signal and the generated music signal to sound the singing voice sound, the harmony chorus sound and the karaoke accompaniment sound concurrently with each other.

2. A karoke apparatus according to claim 1, wherein the first processor device imparts a relatively strong effect to the singing voice sound while the second processor device imparts a relatively weak effect to the harmony chorus sound.

3. A karaoke apparatus according to claim 1, wherein the first processor device and the second processor device impart an effect selected from a group consisting of an echo, a reverberation and a frequency response at different degrees between the singing voice sound and the harmony chorus sound.

4. A karaoke apparatus according to claim 1, further comprising a third processor device that processes the music signal separately from the vocal signal and the harmony signal to impart a further effect to the karaoke accompaniment sound independently from the singing voice sound and the harmony chorus sound.

5. A method of performing karaoke comprising the steps of:

collecting a singing voice sound to convert the singing voice sound into a corresponding vocal signal;

generating a music signal representative of a karaoke accompaniment sound which is selected to accompany the singing voice sound;

generating a harmony signal representative of a harmony chorus sound which is made consonant with the singing voice sound, wherein the step of generating the harmony signal shifts a pitch of the vocal signal to modify the vocal signal into the harmony signal;

processing the vocal signal to impart an effect to the collected singing voice sound;

processing the harmony signal separately from the vocal signal to impart another effect to the harmony chorus sound independently from the signing voice; and amplifying the processed vocal signal, the processed harmony signal and the generated music signal to sound the singing voice sound, the harmony chorus sound and the karaoke accompaniment sound concurrently with each other.

6. A method according to claim 5, wherein the step of processing the vocal signal imparts a relatively strong effect to the singing voice sound while the step of processing the harmony signal imparts a relatively weak effect to the harmony chorus sound.

7. A method according to claim 5, wherein the steps of processing the vocal signal and the harmony signal impart an effect selected from a group consisting of an echo, a reverberation and a frequency response at different degrees between the singing voice sound and the harmony chorus sound.

8. A method according to claim 5, further comprising the step of processing the music signal separately from the vocal signal and the harmony signal to impart a further effect to the karaoke accompaniment sound independently from the singing voice sound and the harmony chorus sound.

* * * * *